(12) United States Patent
Chun et al.

(10) Patent No.: US 7,709,126 B2
(45) Date of Patent: May 4, 2010

(54) ELECTROKINETIC MICRO POWER CELL USING PILE-UP DISK TYPE MICROFLUIDIC-CHIP WITH MULTI-CHANNEL

(75) Inventors: Myung-Suk Chun, Seoul (KR); Min Suk Shim, Guri-si (KR); Dae Ki Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1130 days.

(21) Appl. No.: 11/342,844

(22) Filed: Jan. 31, 2006

(65) Prior Publication Data

US 2007/0099059 A1    May 3, 2007

(30) Foreign Application Priority Data

Oct. 28, 2005  (KR) .................. 10-2005-0102348

(51) Int. Cl.
  *H01M 2/00* (2006.01)
  *H01M 8/16* (2006.01)
  *H01M 2/14* (2006.01)
  *H01M 2/38* (2006.01)
  *H02N 11/00* (2006.01)
  *G01N 27/447* (2006.01)

(52) U.S. Cl. .................. 429/34; 429/12; 429/38; 429/51; 204/600

(58) Field of Classification Search .............. 429/12, 429/34, 38, 51, 73, 81, 123, 128
See application file for complete search history.

(56) References Cited

U.S. PATENT DOCUMENTS 6,361,892 B1 *  3/2002  Ruhl et al. .............. 429/30
6,727,099 B2    4/2004  Chun et al.

OTHER PUBLICATIONS

C.L. Rice et al., Electrokinetic Flow in a Narrow Cylindrical Capillary', *J. Phys. Chem.*, 69(11), 4017-4024, 1965.
S. Levine et al., "Theory of Electrokinetic Flow in Fine Cylindrical Capillaries at High Zeta-Potentials", *J. Colloid Interface Sci.*, 52(1), 136-149, 1975.

(Continued)

*Primary Examiner*—Alex Noguerola
(74) *Attorney, Agent, or Firm*—McDermott Will & Emery LLP

(57) ABSTRACT

Disclosed is a micro power cell capable of being applied as an energy source and utilizing a streaming potential phenomenon occurring in accordance with an electrokinetic principle when an electrolyte aqueous solution flows in the microchannels piled up in several layers. The streaming potential cell consists of a PDMS microfluidic-chip fabricated by MEMS process as well as micromachining technology. The microfluidic-chip is formed with multi microchannels radially arranged in parallel with each other around a center of a disk at a regular interval. The disk type multi microchannel can achieve uniform inflow and outflow effects. According to the invention, there is provided a cell device comprising a pile-up chip having a number of disk type microfluidic-chips with the optimal structure of flow-in and flow-out of a fluid, a distributor, a collector, an electrode insertion part, etc.

30 Claims, 14 Drawing Sheets

OTHER PUBLICATIONS

C. Causserand et al., "Study of streaming potentials of clan and fouled ultrafiltration membranes", *J. Membr. Sci.,* 88, 211-222, 1994.

A. Szymczyk et al., "Electrokinetic Phenomena in Homogeneous Cylindrical Pores", *J. Colloid Interface Sci.,* 216, 285-296, 1999.

J.H. Sung, et al., "On the behavior of electrokinetic streaming potential during protein filtration with fully and partially retentive nanopores", *J. Colloid Interface Sci.,* 264, 195-202, 2003.

J. Yang et al., "Electrokinetic microchannel battery by means of electrokinetic and microfluidic phenomena", *J. Micromech. Microeng.,* 13, 963-970, 2003.

W. Olthuis et al., "Energy from streaming current and potential", *Sens. Actuators* B, 111-112, 385-389, 2005.

M.S. Chun et al., "Microfluidic analysis on electrokinetic streaming potential by microflows of monovalent electrolyte solution", *J. Micromech. Microeng.,* 15, 710-719, 2005.

B. H. Jo et al., "Three-Dimensional Mirco-Channel Fabrication in Polydimethoylsiloxane (PDMS) Elastomer", *J. Microelectromech.,* 9(1), 76-81, 2000.

J.C. McDonald, et al., "Poly(dimethylsiloxane) as a material for fabricating microfluidic devices", *Acc. Chem. Res.,* 35(7), 491-499, 2002.

* cited by examiner

ELECTROKINETIC MICRO POWER CELL USING PILE-UP DISK TYPE MICROFLUIDIC-CHIP WITH MULTI-CHANNEL

BACKGROUND OF THE INVENTION

1. Field of the Invention

The present invention relates to a micro power cell capable of piling up a disk type microfluidic-chip to generate an electric energy by a streaming potential of a fluid flowing through a multi micro channel of the chip.

2. Description of the Prior Art

When fluid flows through a charged channel by pressure gradient, the density of counter-ions whose charge is opposite to that of the wall surface becomes higher near the surface of the channel wall, resulting in an establishment of the electric double layer (so-called Debye layer). Counter-ions in the electric double layer generate the streaming current by the flow to a direction of the pressure gradient. Due to the potential difference caused by distribution gradient between the co-ions and the counter-ions, the streaming potential generates between upstream and downstream of the channel. Since counter-ions are accumulated in the downstream, the counter-ions move to the opposite direction of the pressure gradient (i.e., the opposite direction of the fluids flow) by the back diffusion effect, and thus conduction currents are induced. Note that a summation of the streaming current and the conduction current is zero at steady state, meaning the conservation of net current in the channel.

When the electrolyte solution prepared with arbitrary ionic concentration (i.e., the ionic strength) flows through the straight cylindrical channel having a well-defined circular cross-section, the relationship between the zeta potential $\zeta$ and the streaming potential E is given by equation 1 referred to as Helmholtz-Smoluchowski (H-S) equation.

$$\frac{\Delta E}{\Delta p} = \frac{\varepsilon_o \varepsilon_r \zeta}{\eta \lambda_o} \quad \text{[Equation 1]}$$

wherein, $\in$ denotes the potential induced by the electrokinetic effect, i.e., the streaming potential, $\Delta p$ denotes the applied pressure difference exerted between both ends of the channel, $\in_o$ denotes the dielectric constant at vacuum or vacuum permittivity, $\in_r$ denotes the relative permittivity of the electrolyte solution, $\lambda_o$ denotes the electric conductivity of the electrolyte solution, and $\eta$ denotes the viscosity of the electrolyte solution.

Many researchers have tried to understand the electrokinetic phenomena, and to analyze the fluid flowing in the microchannel with diameter less than several hundreds micrometers and the streaming potential according to it.

Rice and Whitehead addressed a correction factor from the analytic solution of Poisson-Boltzmann (P-B) equation that should be applied to the case of using the H-S equation (i.e., equation 1) when the surface potential is low in the paper [C. L. Rice, R. Whitehead, "Electrokinetic flow in a narrow cylindrical capillary", *J. Phys. Chem.*, 69, 4017-4024, 1965]. Levine et al. presented an analytic solution of the P-B equation to monovalent symmetric electrolyte solution with same mobilities for full range of the surface potential in the paper [S. Levine, J. R. Marriott, G. Neale, N. Epstein, "Theory of electrokinetic flow in fine cylindrical capillaries at high zeta-potentials", *J. Colloid Interface Sci.*, 52, 136-149, 1975].

The streaming potential, which is an opposite mechanism to the electro-osmosis, is one of the electrokinetic phenomena. The streaming potential has been considered as a useful method for determining the unknown zeta potential, corresponding to the surface potential of charged material. From studies disclosed in Causserand et al.'s paper [C. Causserand, M. Nyström, P. Aimar, "Study of streaming potentials of clean and fouled ultrafiltration membranes", *J. Membr. Sci.* 88, 211-222, 1994] and Szymczyk et al.'s paper [A. Szymczyk, B. Aoubiza, P. Fievet, J. Pagetti, "Electrokinetic phenomena in homogeneous cylindrical pores", *J. Colloid Interface Sci.* 216, 285-296, 1999], it can be known that the measurement of electrokinetic streaming potential effectively contributes to the charge characterization of the pore and the surface of porous material.

As disclosed in Sung et al.'s paper [J. H. Sung, M.-S. Chun, H. J. Choi, "On the behavior of electrokinetic streaming potential during protein filtration with fully and partially retentive nanopores", *J. Colloid Interface Sci.* 264, 195-202, 2003], or Chun et al.'s US patent [M.-S. Chun, J.-J. Kim, S.-Y. Lee, "Equipment and method of local streaming potential measurement for monitoring the process of membrane fouling in hollow-fiber membrane filtration", U.S. Pat. No. 6,277,099 B2, 2004], important information about the colloidal particle deposition onto the surface of the porous membrane can be obtained by monitoring the dynamic behavior of electrokinetic streaming potentials with time progress.

The physical meaning of above equation 1 is that when the electrolyte solution flows in a charged channel with a pressure gradient $\Delta p$, the potential difference $\Delta E$ occurs between the ends of the channel. Accordingly, connecting the external circuit applied with an appropriate resistance provides the electrical energy encountered by electric current and potential.

In recent years, studies were explored on whether a streaming potential occurring from the electrokinetic principle can be used as an energy source. D. Y. kwok, et al. reported that when tap water was allowed to flow in a porous glass filter having a pore size of 10~16 μm (diameter: 2 cm, thickness: 3 mm, Schott-Duran, Mainz) by the pressure difference, a maximum streaming potential resulting from the flow was 10V and a maximum electric current was several μA [J. Yang, F. L. Larry, W. Kostiuk, D. Y. Kwok, "Electro-kinetic microchannel battery by means of electro-kinetic and microfluidic phenomena", *J. Micromech. Microeng.*, 13, 963-970, 2003].

Olthuis et al. reported the streaming potential and energy resulting from a change of an external resistance with regard to the same filter having a pore size of 1.0~1.6 μm [W. Olthuis, B. Schippers, J. Eijkel, A. van den Berg, "Energy from streaming current and potential", Sens. Actuators B, 111-112, 385-389, 2005].

In addition, Chun et al. established a theoretical model of an electrokinetic flow field and carried out the numerical computations to build theoretical origins capable of predicting a streaming potential in a multi-channel circuit [M.-S. Chun, T. S. Lee, N. W. Choi, "Microfluidic Analysis on Electrokinetic Streaming Potential by Microflows of Monovalent Electrolyte Solution", *J. Micromech. Microeng.*, 15, 710-719, 2005].

Until now, however, it has not been developed a power cell capable of commercializing the streaming potential.

Both the micro-electromechanical system (MEMS) process and micromachining technologies allow us to fabricate microchannels with desired channel dimension. Using the lab-on-a-chip technique based on these technologies, the micro total analysis system (μ-TAS) as well as the high throughput system (HTS) can be realized.

After the middle of 1990s, micromachining technology for the disposable plastic materials that are easily replicable in mass has been developed. The master mold for replication can be made by the traditional silicon-based micromachining technology. Like the study of Jo et al. [B.-H. Jo, L. M. van Lerberghe, K. M. Motsegood, D. J. Beebe, "Three-dimensional micro-channel fabrication in polydimethylsiloxane (PDMS) elastomer", J. Microelectromech. Sys., 9(1), 76-81, 2000], a method using photoresist SU8 and polydimethylsiloxane (PDMS) is widely known as a simple and low-cost technology among the technologies using organic polymers.

To make the microchannel, a master mold patterning the channel shape is formed on the silicon wafer. Liquid PDMS prepolymer is poured over the mold, and then cure it. Subsequently, the PDMS replica is peeled from the master, and cut into a proper size. Then, the replica is sealed to either glass coverslip or PDMS substrate to enclose the channels.

As disclosed in the study of McDonald and Whitesides [J. C. McDonald, G. M. Whitesides, "Poly(dimethylsiloxane) as a material for fabricating microfluidic devices", Acc. Chem. Res., 35(7), 491-498, 2002], the above method is easier in process and lower in cost than the conventional method of etching the glass or silicon wafer in view of mass production of microfluidic-chip.

Especially, since PDMS is indeed inert and transparent in the range of visible or near UV lights, it has merits as a material for microfluidic devices.

SUMMARY OF THE INVENTION

Accordingly, the present invention has been made to solve the above-mentioned problems occurring in the prior art. The inventors embodied an electrokinetic micro power cell implementing a streaming potential occurring when the electrolytic aqueous solution flows in a microchannel, that is an electrokinetic phenomenon. The inventors invented a disk type microfluidic-chip having a multi microchannel fabricated according to MEMS process as well as micromachining technology based on a conventional replica molding (REM) technique and a streaming potential cell comprising a holder having the chips piled up therein.

An electrokinetic micro power cell according to the invention is able to achieve the uniform flows into all individual microchannels of the disk type chip, thereby obtaining a stable energy. As the number of the channels is increased due to the pile-up of the chips, the external current is increased so that a more increased electric energy can be obtained.

Accordingly, the object of the present invention is to provide a micro power cell using a pile-up disk type microfluidic-chip with multi microchannels capable of generating a more increased electric energy.

The invention relates to a disk type microfluidic-chip having multi microchannels and capable of generating an electric energy by means of a streaming potential of a fluid flowing in the microchannel, a streaming potential cell device consisting of a holder having the chips piled up therein, and a micro power cell using them.

In order to accomplish the objects, there is provided a disk type microfluidic-chip comprising an inflow space at a center of the disk to which a fluid is supplied; a multi microchannel, each of the microchannels being arranged in parallel with each other and radially positioned around the inflow space, wherein a potential difference occurs between both ends of an inlet and an outlet of each microchannel by the streaming potential when the fluid passes through the microchannel; and an outflow space at a circumference of the disk from which the fluid is discharged.

In fabricating the microfluidic-chip, it is preferred to make an alignment mark adjacent to a circumference of the disk so as to cut the fabricated chip into a prescribed size.

According to an embodiment of the invention, a width of the microchannel may be about 10~200 μm, preferably about 20~80 μm. In addition, a depth of the microchannel may be about 10~200 μm, preferably about 50~100 μm. Additionally, a length of the microchannel may be about 500 μm~0.5 cm, preferably about 1 mm~3 mm.

According to an embodiment of the invention, the interchannel distance may have a trapezoidal feature whose shorter base distance is about 10~200 μm, preferably about 20~50 μm. In addition, a longer base distance of the trapezoid may be about 30~600 μm, preferably about 60~150 μm.

According to an embodiment of the invention, the number of the microchannels may be about 100~1000, preferably 200~500.

According to an embodiment of the invention, the disk type microfluidic-chip preferably consists of an upper substrate and a lower substrate. The upper substrate may be provided with the multi microchannel formed at a height from a bottom surface thereof and forming a space through which the fluid is able to flow, and the lower substrate may be shaped into a flat plate having a thickness of 1.5~2.5 mm. The lower substrate is also formed with the inflow space at the center of the disk.

According to an embodiment of the invention, the upper and lower substrates may be made of polydimethylsiloxane (PDMS) that is a transparent material. The multi microchannel of the upper substrate is bonded with the lower substrate to make microchannels.

In the mean time, according to the invention, the disk type microfluidic-chips are piled up. Accordingly, it is possible to pile up only the upper substrates having multi microchannels formed thereto one by one, thereby forming perfect microchannels. In this case, the upper substrate can also serve as the lower substrate, since an upper surface of an upper substrate positioned downside is flat.

The inflow space of the chip is a space in which an electrode is positioned so that a potential difference between both ends of the microchannel can be used. A diameter of the inflow space should be larger than that of the electrode (typically, 2 mm).

According to the invention, there is provided a holder having a disk type microfluidic-chip piled up therein, the holder comprising: a flow-in to which a fluid is supplied; a tubular distributor allowing the fluid supplied through the flow-in to flow into a multi microchannel through an inflow space of the pile-up disk type microfluidic-chip; a chip insertion part allowing the disk type microfluidic-chip to be mounted therein; a collector colleting the fluid flowing out of the multi microchannel of the pile-up disk type microfluidic-chip; a connection part having a flow-out formed thereto so as to discharge the fluid collected in the collector, transporting the fluid of the collector to the flow-out and sealing an uppermost end of a central inlet of the pile-up chip mounted in the chip insertion part; a cover part wrapping the connection part and the chip insertion part to be perfectly sealed and preventing the fluid from flowing out of the holder; and a pair of electrodes positioned at the distributor and either the collector or the connection part, respectively, and capable of being connected to an external circuit.

According to an embodiment of the invention, the distributor and either the collector or the connection part may be provided with an electrode insertion part capable of allowing the pair of electrodes to be inserted.

According to an embodiment of the invention, the fluid preferably flows in the inflow space of the pile-up disk type chip and flows out to the outflow space of the chip.

According to an embodiment of the invention, the chip insertion part may be designed in consideration for an outer diameter of the microfluidic-chip and a thickness of the pile-up chip. According to an embodiment of the invention, the chip insertion part may provide the space so that the disk type microfluidic-chips having an outer diameter of 12.2 mm can be mounted with a pile-up thickness of 35 mm, and take a cylindrical shape having an inner diameter of 20 mm and a height of 40 mm.

According to an embodiment of the invention, in order to protect the pile-up chip and to prevent a water leakage, plastic rings are preferably provided between the chip and the connection part and between the chip and the chip insertion part.

According to an embodiment of the invention, the electrode positioned at the distributor of the holder may be an Ag/AgCl electrode and positioned to a center of a chip located at the uppermost part so that it is able to pass through all the inflow spaces of the piled chips.

According to the invention, there is provided a micro power cell comprising the pile-up disk type microfluidic-chip and the holder for containing the chip therein, and capable of generating an electric energy by means of a streaming potential of the fluid flowing in the microchannel.

According to an embodiment of the invention, the pile-up disk type microfluidic-chip may be fabricated by MEMS process. Specifically, a doughnut-shaped disk type microfluidic-chip is fabricated through steps of preparing a mask pattern, exposing a substrate having a photoresist stacked through the mask pattern to UV for a patterning, preparing a master mold, bonding an upper substrate replicated by molding the PDMS and a cured lower PDMS substrate with reactive ion etching (RIE) apparatus, cutting a disk preferably having a diameter of 12.2 mm on the basis of an alignment mark made on the upper substrate, and forming an inflow space preferably having a diameter of 4.4 mm in a center of the prepared disk chip.

It is possible to vertically bond the disk type microfluidic-chips with the RIE apparatus, thereby fabricating a pile-up disk type microfluidic-chip having highly increased the number of microchannels.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

EXAMPLE 1

Figure 1:
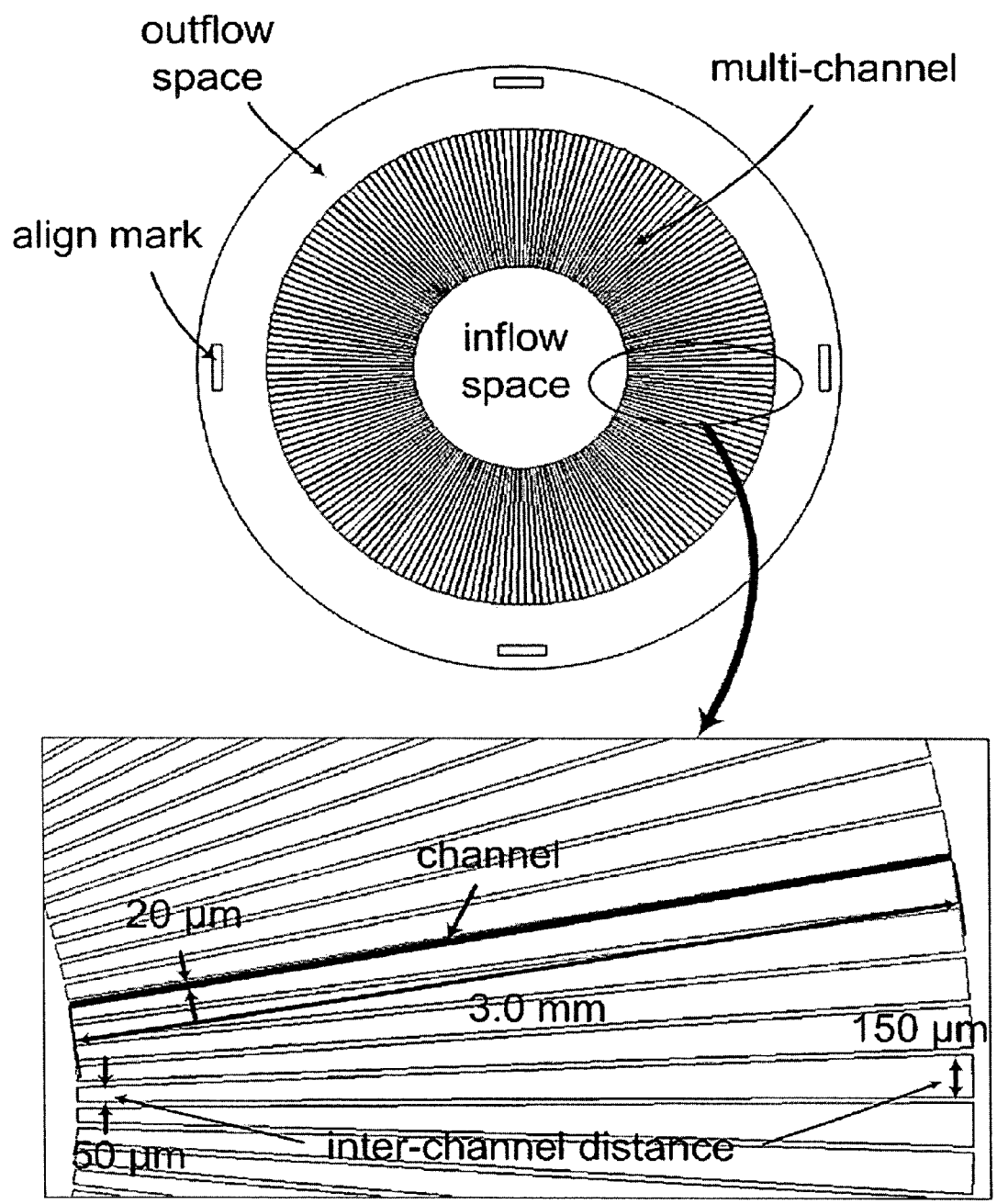
FIG. 1 is a layout of a photomask for fabricating a disk type microfluidic-chip with a multi microchannel.

Fabricating a Disk Type Microfluidic-chip with a Multi Microchannel and Piling Up FIG. 1 is showing a photomask designed with AutoCad® 2004, which is a first step for fabricating a microfluidic-chip according to the invention. The photomask for the chip fabricating comprises an inflow space of a fluid, a multi microchannel, an alignment mark and an outflow space.

The inflow space through which the fluid flows in the chip is designed in consideration for a diameter of an electrode because an Ag/AgCl electrode having a diameter of 2 mm should be located therein. About 200 microchannels are arranged in a fan-bracings shape around the inflow space at a regular interval. Owing to such design, when the fluid flows in the 200 microchannels, the fluid can flow in each inlet of the microchannels and equivalently flow out of an outlet of the microchannel. If the microchannels are not arranged at a regular interval, the fluid flow deviates from this behavior, so that a potential difference between both ends of the microchannel is decreased and thus it is difficult to generate a stable electric energy. According to this embodiment, in consideration for an insertion of the Ag/AgCl electrode having an outer diameter of 2 mm and a transporting space of the fluid, a diameter of the inflow space was set up to be 4.4 mm and a diameter of the chip was set up to be 12.2 mm including a channel length (3 mm) and the outflow space.

Figure 2:
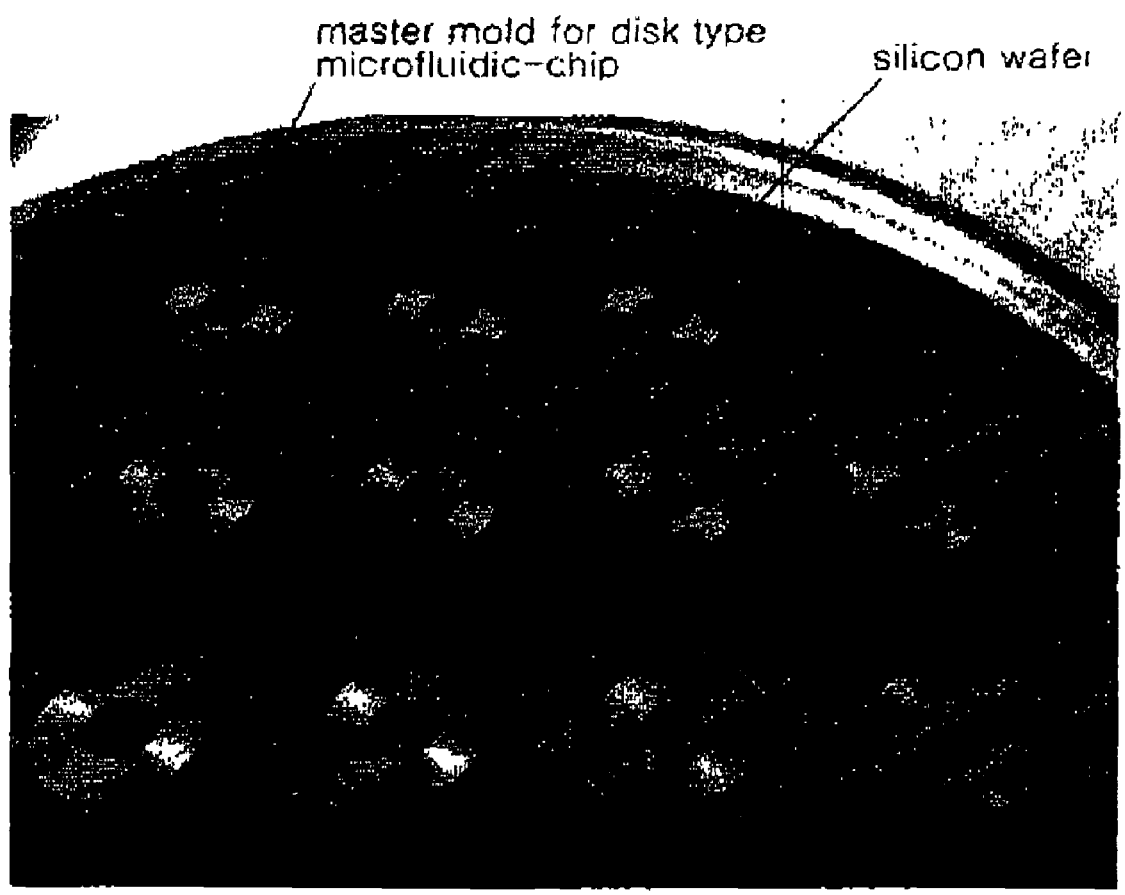
FIG. 2 is a photograph of a master mold used to fabricate a disk type PDMS microfluidic-chip with a multi microchannel.
Figure 3:
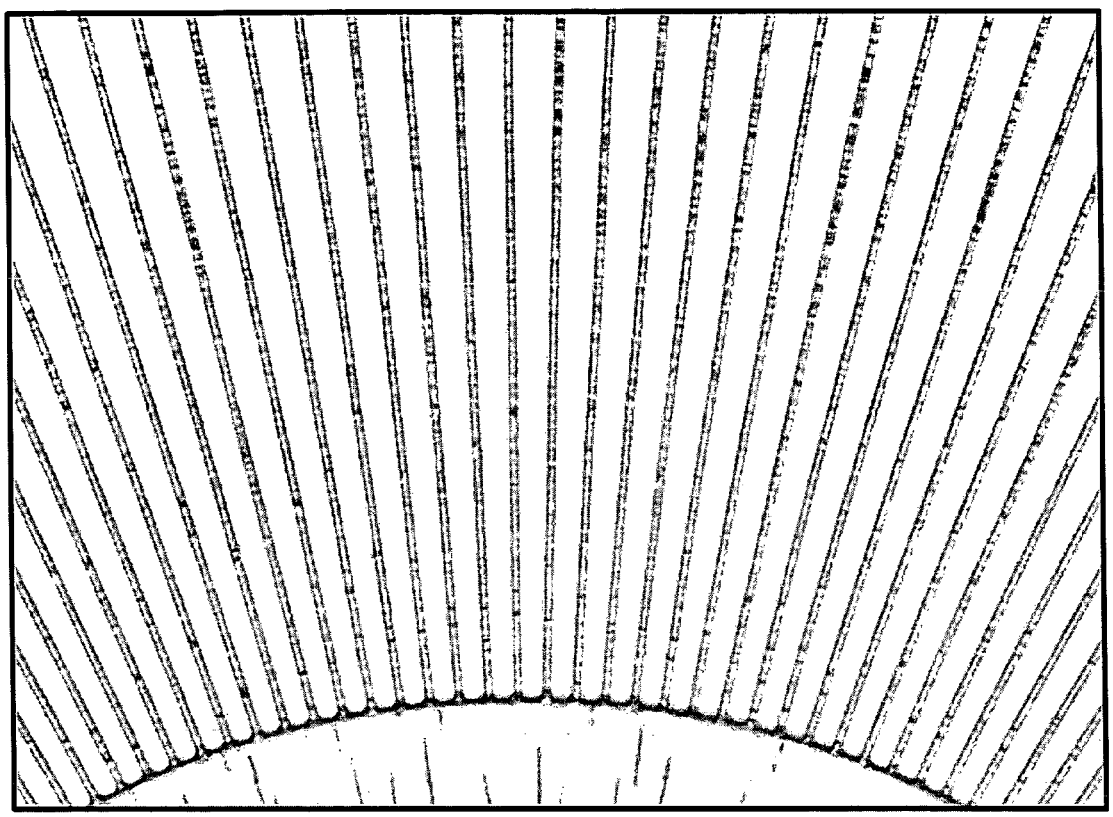
FIG. 3 is a photograph of a multi microchannel formed on a master mold taken by optical microscope.

FIG. 2 is a photograph of a master mold of a disk type microfluidic-chip formed on a silicon wafer by MEMS process, and FIG. 3 is a photograph of a multi microchannel taken by optical microscope. A photoresist SU8-50 (Micro-Chem Co., MA, USA) was patterned to have a thickness of 100 μm on the silicon wafer having a diameter of 4 inch by UV exposure process.

In a chip having a multi microchannel, an inter-channel distance should be properly regulated so as to increase an endurance pressure. According to this embodiment, an inter-channel distance was designed to be 50~150 μm. When this distance is unduly narrow (for example, less than 30 μm), the incomplete patterning is made or a region between the microchannels, which should not be exposed to the light, is exposed, thereby causing a crosslink.

A PDMS part produced by the inter-channel distance of 50~150 μm is activated at its surface by $O_2$ plasma and thus is adhered to a lower PDMS substrate. If a microchannel in the chip can endure up to about 5 bar, the inter-channel distance is preferably above 50 μm when a depth of the microchannel is 100 μm.

Figure 4A:
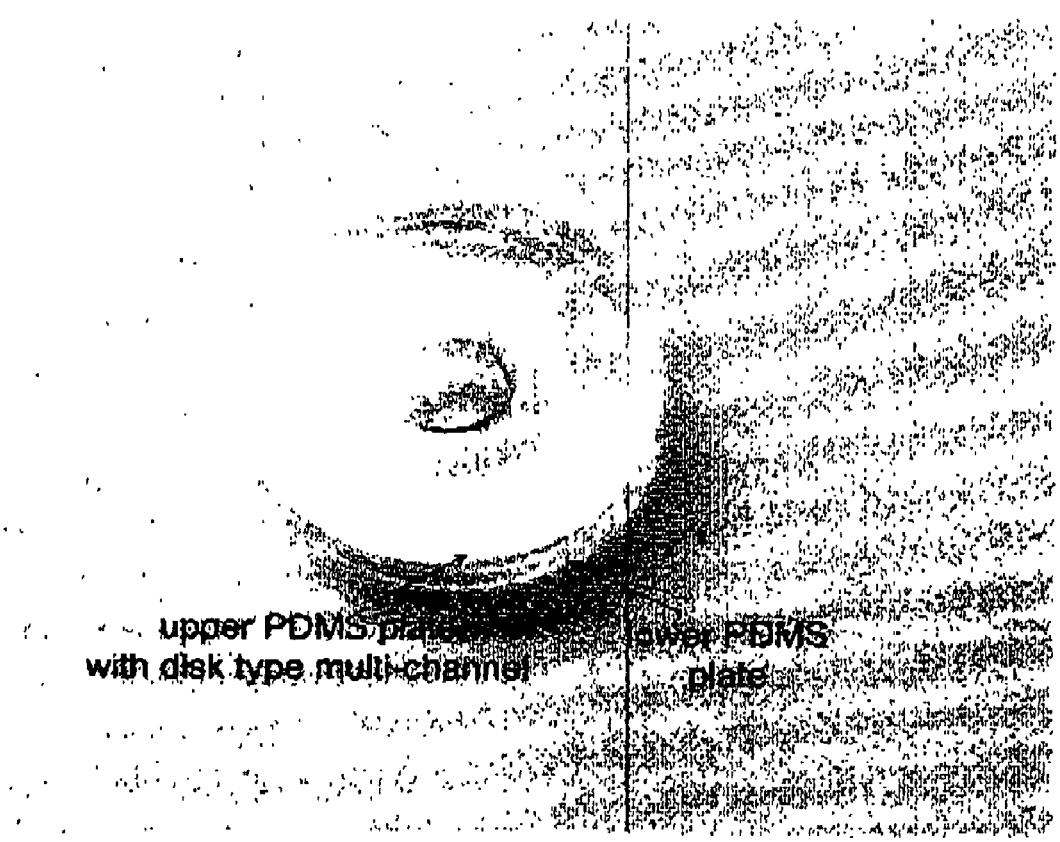
FIG. 4a is a photograph of a completed disk type microfluidic-chip with a multi microchannel.

FIG. 4a is a photograph of a disk type microfluidic-chip completed by bonding an upper substrate replicated by molding PDMS (Sylgard 184 elastomer, Dow Corning, MI, USA) and a cured lower PDMS substrate with a RIE apparatus, and cutting the substrates into a doughnut shape having an outer diameter of 12.2 mm and an inner diameter of 4.4 mm with a circular punch.

Figure 4B:
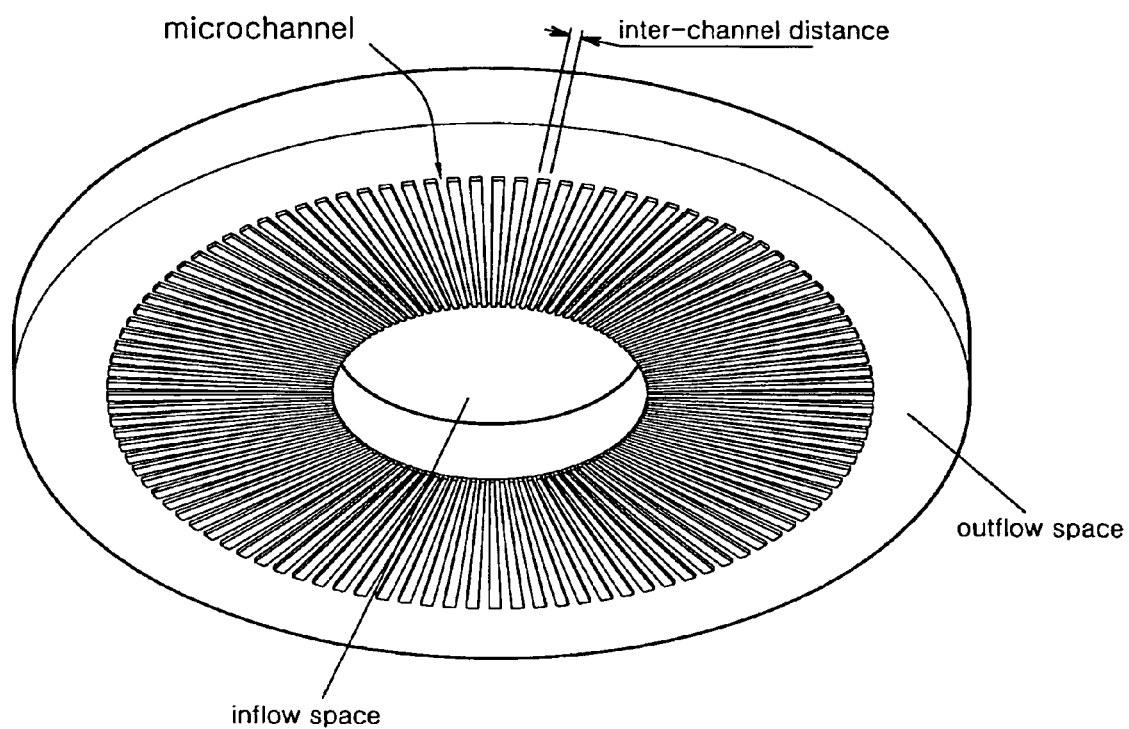
FIGS. 4b and 4c are perspective bottom view and bottom view of an upper substrate building a disk type microfluidic-chip with a multi microchannel, respectively.
Figure 4C:
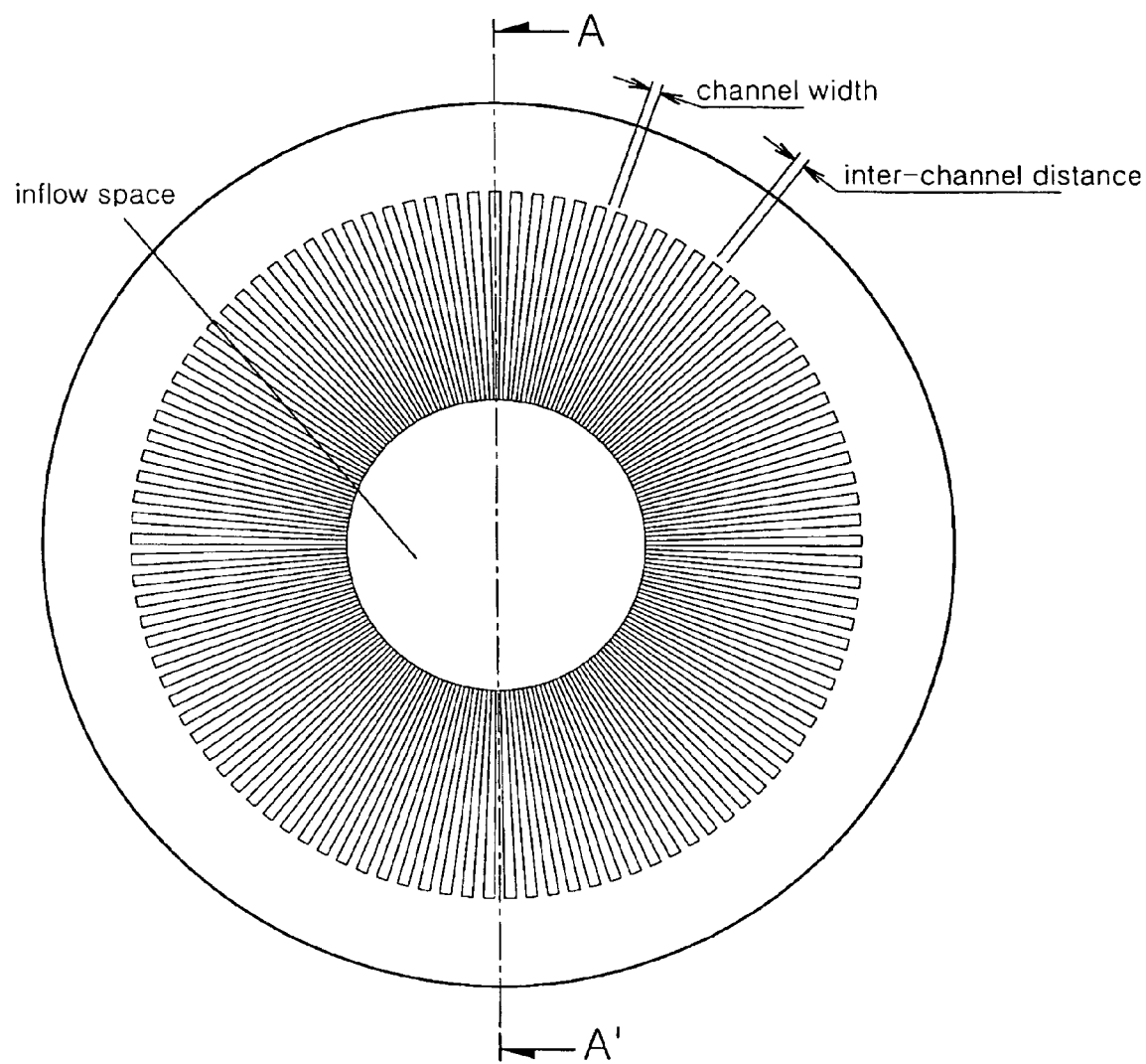
Figure 4D:
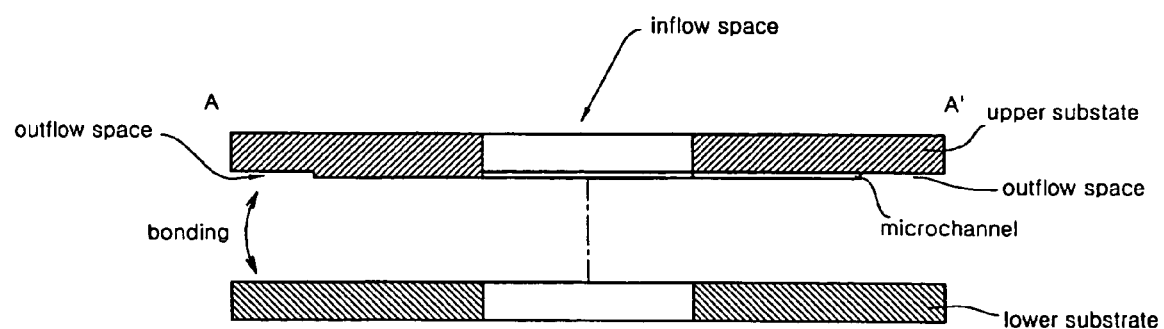
FIG. 4d is an exploded sectional view of a microfluidic-chip consisting of upper and lower substrates.

FIGS. 4b and 4c are perspective bottom view and bottom view of the upper substrate of the completed disk type microfluidic-chip, respectively. FIG. 4d is a sectional view of the microfluidic-chip taken along a line A-A' shown in FIG. 4c.

In fabricating the microfluidic-chip, the PDMS surface is treated by $O_2$ plasma with about 50 W power for 10 seconds using the RIE apparatus, for the bonding. The microfluidic-chip can endure the pressure difference between both ends of the microchannel up to about 5 bar.

The disk type microfluidic-chips are bonded together by the RIE apparatus, thereby fabricating a pile-up chip stacked a number of the microfluidic-chips.

EXAMPLE 2

Figure 5:
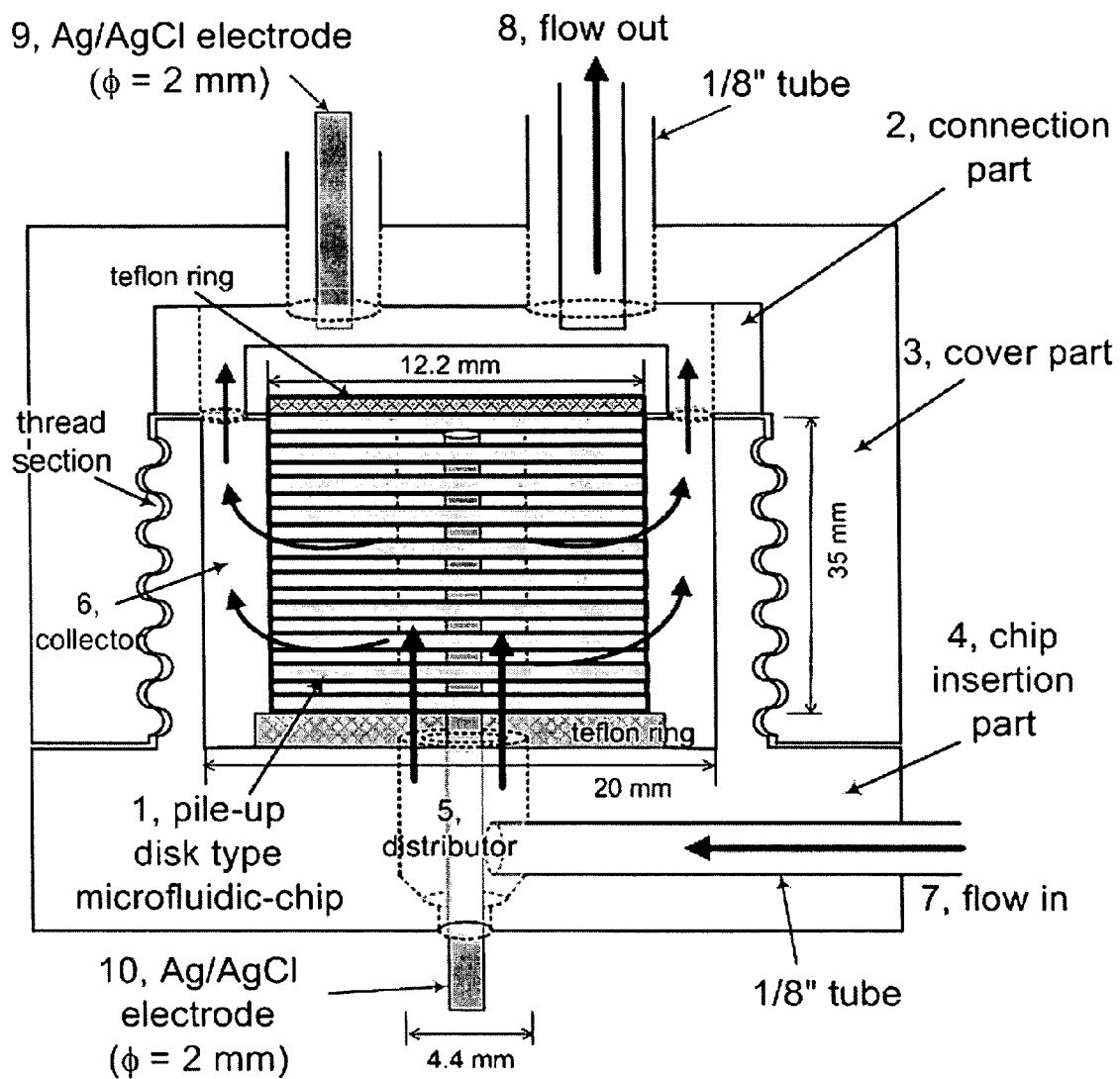
FIG. 5 is a design view of a holder having disk type microfluidic-chips piled up therein.

Fabricating of a Streaming Potential Cell Having a Pile-up Chip Mounted in a Holder FIG. 5 is a design view of a holder containing a pile-up disk type microfluidic-chip 1 therein according to an embodiment of the invention. The chip containing holder made of semi-transparent acrylic resin comprises a fluid flow-in 7, a distributor 5, a chip insertion part 4, a collector 6, a connection part 2, a cover part 3, a flow-out 8, Ag/AgCl electrodes 9, 10 and an electrode insertion part.

The flow-in 7 and the flow-out 8 have a diameter determined so as to be connected to external tubing. According to this embodiment, the diameter is designed to be 7 mm so as to be connected to tubing having an outer diameter of ⅛ inch. The flow-in 7 is positioned to be below the flow-out 8 on the basis of a gravity direction so that the fluid can faithfully flow into the multi microchannel of the pile-up microfluidic-chip by the pressure difference.

Since the Ag/AgCl electrodes are inserted into the distributor 5 and the connection part 2 of the holder, the electrode insertion part should be formed in consideration for an outer diameter of the electrode. According to this embodiment, the distributor 5 and the connection part 2 were formed with electrode insertion parts having a diameter of 3 mm therein so that the electrodes 9, 10 having an outer diameter of 2 mm could be inserted. In addition, in order to prevent a water leakage, O-rings were mounted to parts to which the electrodes 9, 10 were inserted.

The connection part 2 of the holder is fitted into the chip insertion part 4 by a prescribed depth to block an uppermost part of the inflow space of the pile-up chip and to transport the fluid in the collector 6 to the flow-out 8. Accordingly, a diameter and a height of the connection part 2 are determined to conform an inner diameter as well as a depth of the chip insertion part 4. In addition, in order to prevent a water leakage at the contact region of the connection part 2 and the chip insertion part 4, a rubber O-ring is mounted to an end of the connection part 2. According to this embodiment, since an inner diameter and a depth of the chip insertion part were 20 mm and 4 cm, respectively, a diameter and a height of the connection part were designed to be 20 mm and 2.5 cm, respectively.

The cover part 3 of the holder is designed to completely wrap the chip insertion part 4 and the connection part 2 so that the fluid does not flow out of the holder. A thread section is formed in the cover part 3 and a turning thereof is determined by the number of the piled chips mounted in the chip insertion part 4 so that the water leakage does not occur at the insertion part 4 and the connection part 2. According to this embodiment, a length of the thread section of the cover part 3 was made to be 4 cm same as the depth of the chip insertion part 4 so that the cover part 3 could completely wrap the insertion part.

Figure 6:
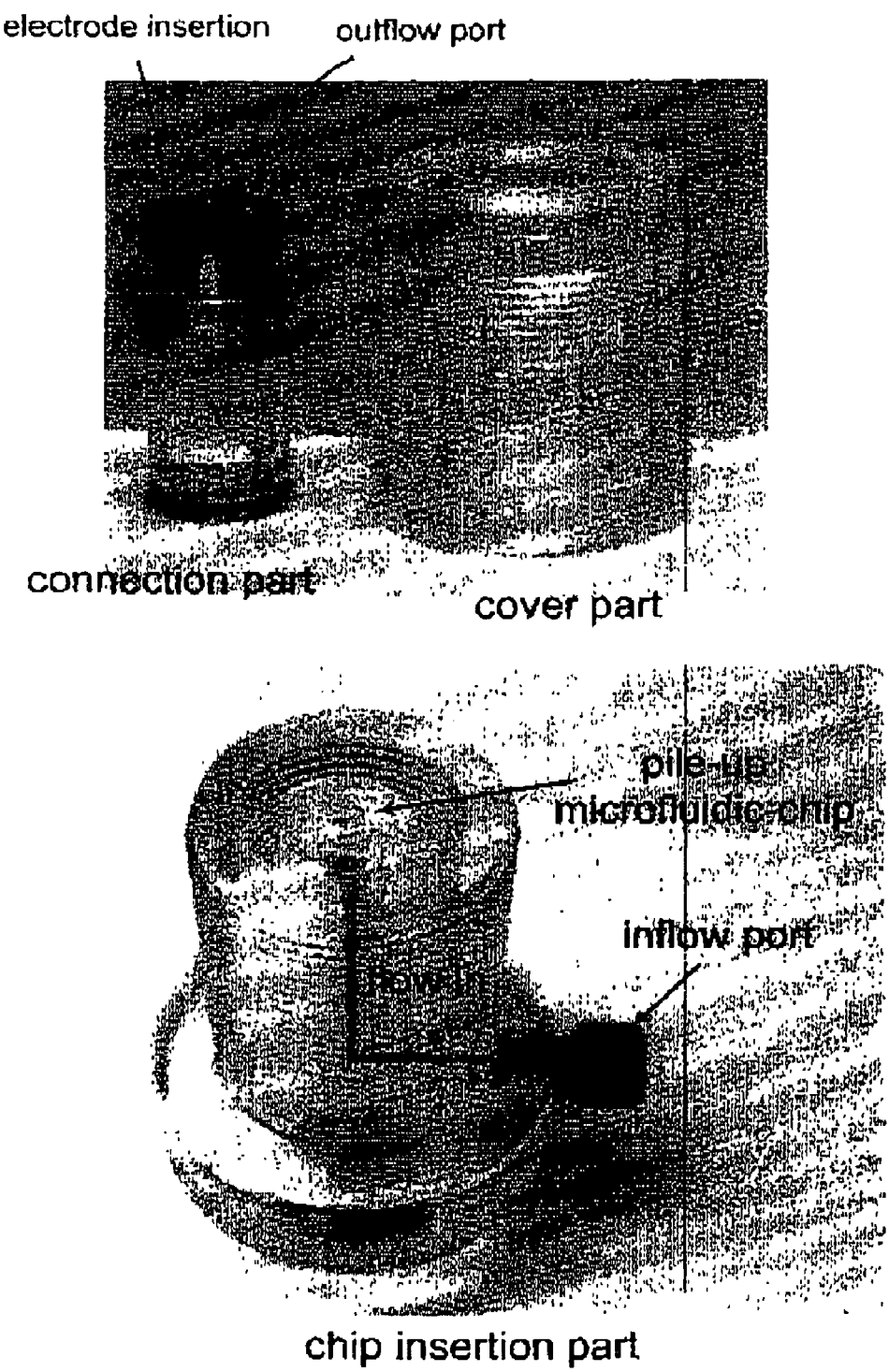
FIG. 6 is a photograph of each part of a holder having disk type microfluidic-chips piled up therein.

FIG. 6 shows photographs of the connection part, the cover part, and the chip insertion part having the pile-up microfluidic-chip mounted therein, which constitute the fabricated holder.

In order to prepare the electrode to be inserted in the holder, an Ag rod having a diameter of 2 mm was cleaned in a 3M $HNO_3$ solution. After that, the Ag rod was connected to an anode (red) of a direct current power supply and a platinum wire was connected to a cathode (black) thereof in a 0.1M HCl solution. Then, a constant current of 4 mA/cm$^2$ was applied to carry out an anodizing process. Through the process, a surface of the Ag rod was coated with AgCl, thereby completing an Ag/AgCl electrode.

Figure 7:
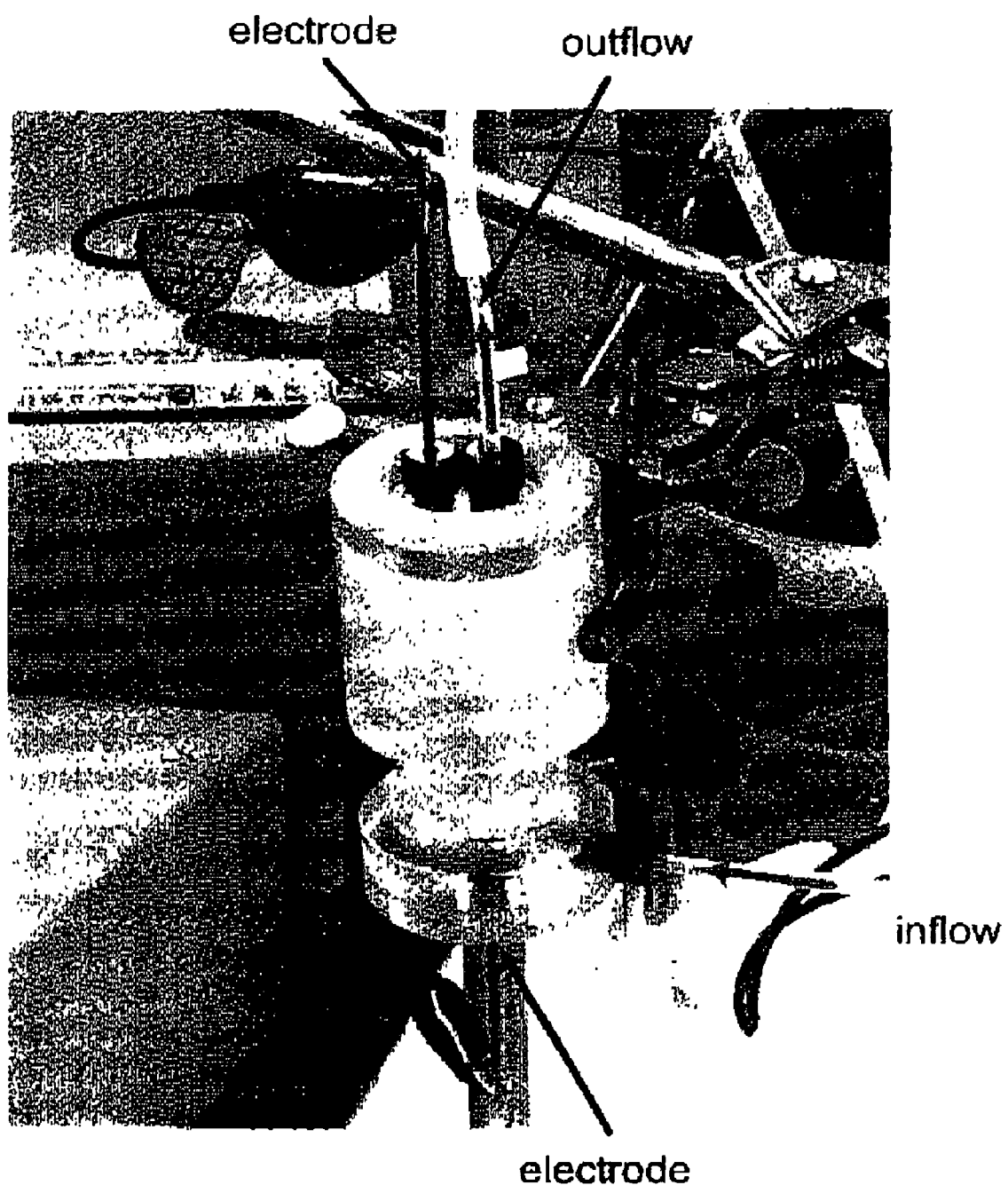
FIG. 7 is a photograph of a streaming potential cell device consisting of a pile-up disk type microfluidic-chip and a holder containing the chips therein.

FIG. 7 is a photograph of a streaming potential cell completed by inserting the Ag/AgCl electrodes 9, 10 in the electrode insertion parts positioned at upper and lower ends of the holder and connecting the tubing having an outer diameter of ⅛ inch to flow-in and flow-out. The external line of Ag electrode is connected to a digital multi-meter via a connector.

When the pure water is supplied in the holder having the pile-up disk type microfluidic-chip mounted therein, an electric energy is generated by means of the streaming potential and the external current.

EXAMPLE 3

Figure 8:
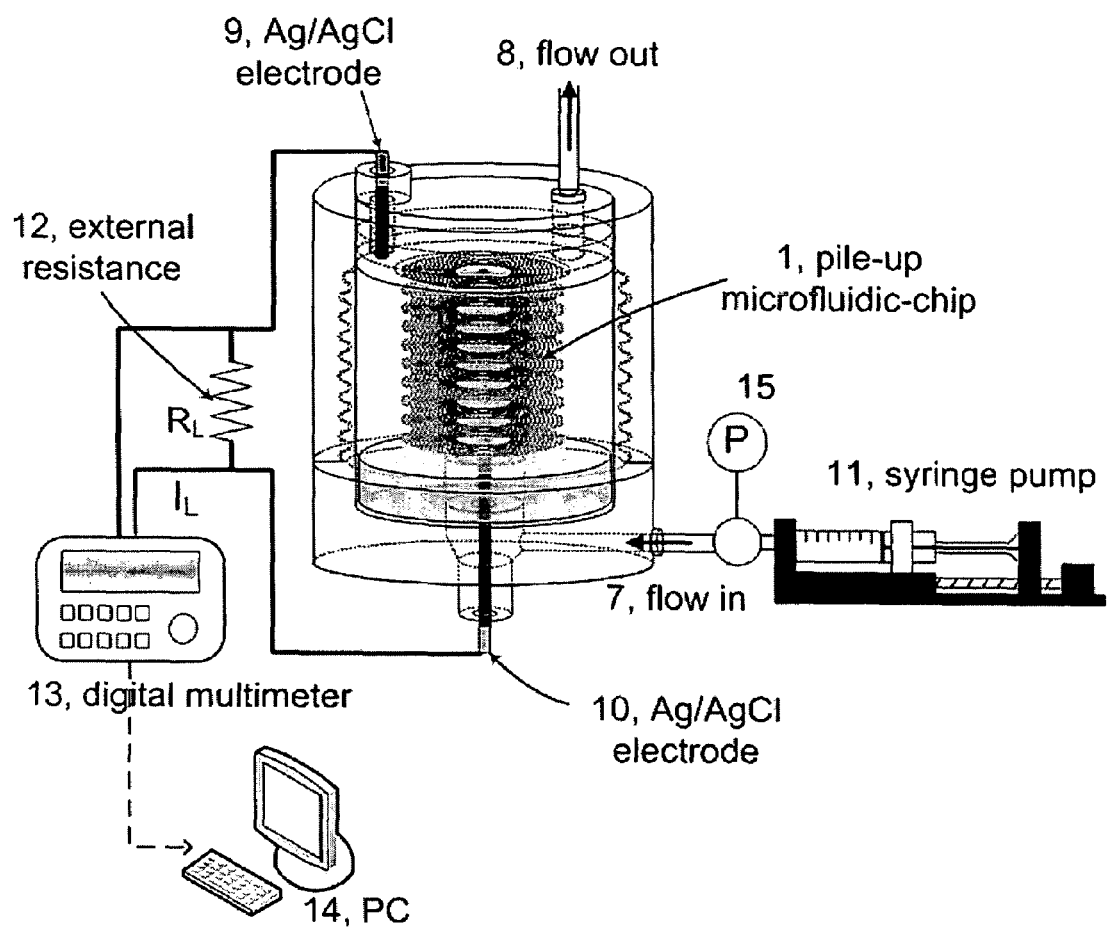
FIG. 8 is a block diagram showing a system of an electrokinetic micro power cell according to an embodiment of the invention.

An Experiment of Measuring a Streaming Potential of a Micro Power Cell According to the Invention and an External Current An electrokinetic micro power cell as shown in FIG. 8 was developed using the streaming potential cell prepared according to the above embodiment. The fluid is supplied to the flow-in 7 of the holder using a syringe pump (Cole-Parmer 74900 Series, IL) 11, passes through the microchannels of the pile-up disk type microfluidic-chip 1 and then is discharged to the flow-out 8. At this time, a pressure difference Δp between both ends of the microchannel was measured with a precision pressure gauge 15 and a streaming potential difference ΔE between both ends of the microchannel was measured with a high-precision digital multi-meter (HP34970A, Hewlett-Packard Co., CA) 13 through the Ag/AgCl electrodes 9, 10 arranged to upper and lower parts of the holder.

Figure 9:
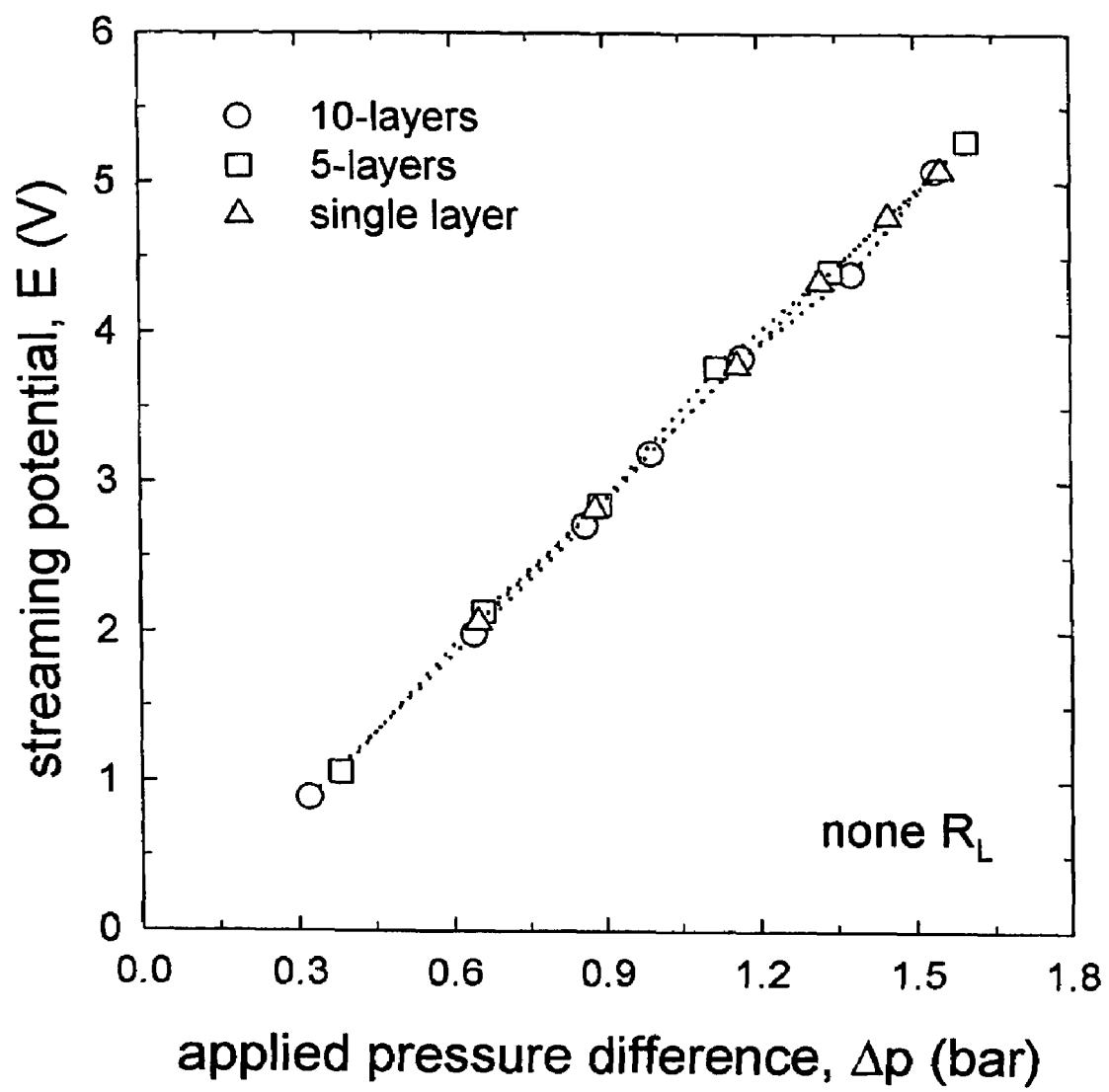
FIG. 9 depicts the results showing measurements of a streaming potential in accordance with a pressure difference without external resistance when pure water containing a very small quantity of electrolytes flows through a multi microchannel of a microfluidic-chip according to an embodiment of the invention.

FIG. 9 depicts the results showing measurements of a streaming potential in accordance with a pressure difference without external resistance when pure water flows through the multi microchannel of the microfluidic-chip, according to an embodiment of the invention. Distilled water was used as the pure water and had an electrolyte concentration of $1 \times 10^{-6}$ to $5 \times 10^{-6}$ M in accordance with contents of various inorganic ions and the like. The streaming potential is linearly increased in proportion to the pressure difference but is not related to the number of the piled chips. This means that the streaming potential has no relation to the number of the microchannels connected in parallel with each other.

Figure 10:
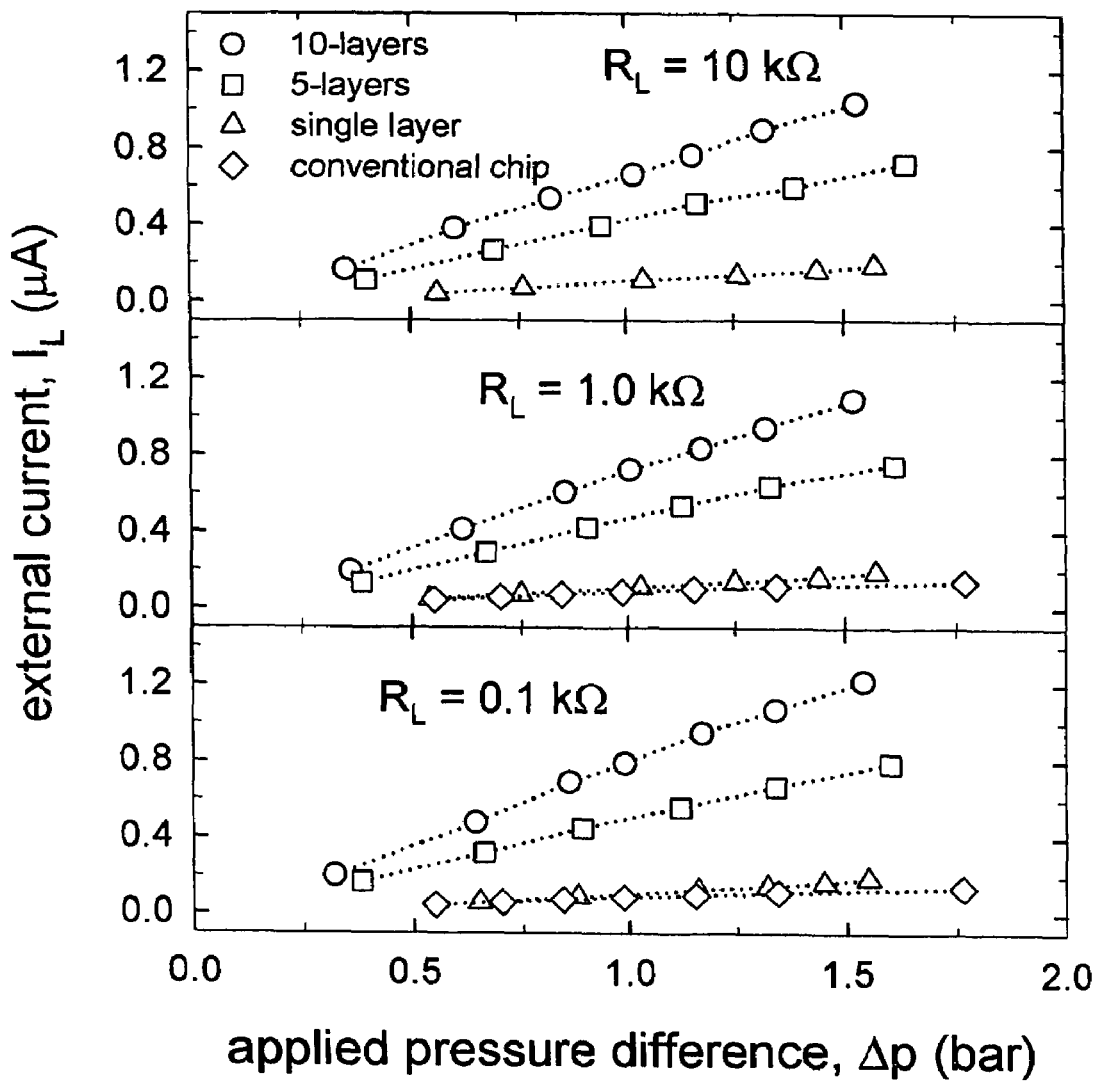
FIG. 10 depicts the results showing measurements of an external current in accordance with a pressure difference regarding several external resistances when pure water flows through a multi microchannel of a microfluidic-chip according to an embodiment of the invention.

FIG. 10 depicts the results showing measurements of an external current $I_L$ in accordance with a pressure difference regarding several external resistances when the external resistance $R_L$ 12 is connected to the Ag/AgCl electrodes and pure water flows through the multi microchannel of the microfluidic-chip. The external current, which is increased as the pressure difference between both ends of the microchannel is increased, becomes greater as the number of the piled chips is increased.

In microchannels having a depth H, a length L and a width W, when both the streaming potential difference ΔE and the external current $I_L$ are measured at given external resistance, a power density PD is calculated as follows.

$$PD = \frac{\Delta E I_L}{N(HWL)} \quad \text{[equation 2]}$$

wherein N is total number of the microchannels.

Figure 11:
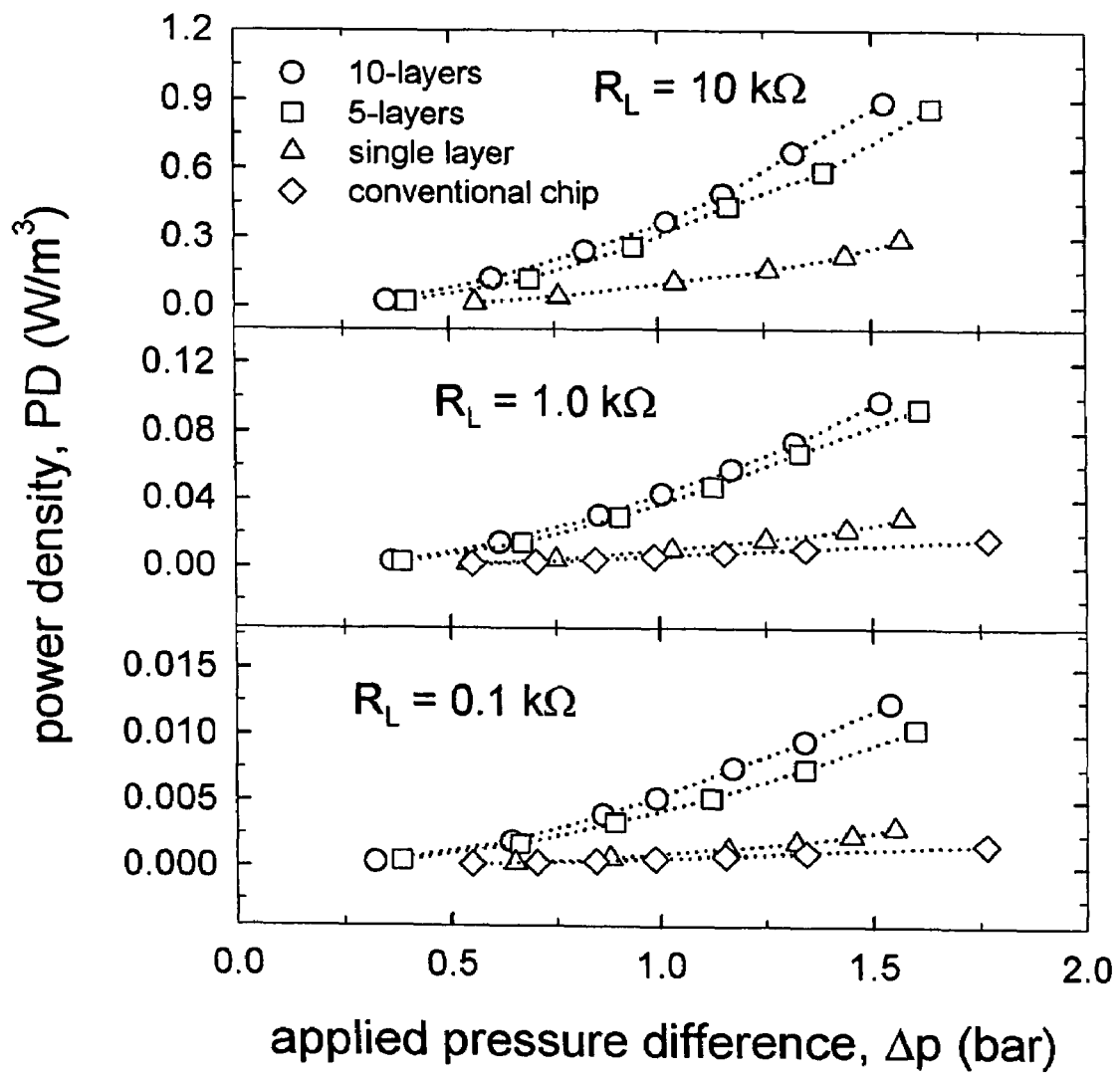
FIG. 11 depicts the results showing measurements of a power density in accordance with a pressure difference regarding several external resistances when pure water flows through a multi microchannel of a microfluidic-chip according to an embodiment of the invention.

FIG. 11 depicts the results showing measurements of the power density in accordance with a pressure difference regarding several external resistances. It was shown that the disk type chip was superior to the conventional chip and the power density was increased as either the pressure difference or the number of piled chips was increased. In particular, the power density was influenced by the external resistance. That is, the power density was increased as much as the external resistance was increased.

As described above, the electrokinetic micro power cell using the pile-up disk type microfluidic-chip with the multi microchannel according to the invention can be used as a new energy source. With the disk type chip properly designed such that the 200 microchannels are arranged at a regular interval, it is possible to obtain uniform inflow and outflow effects for each microchannel. In addition, it is possible to increase the electric energy to be generated, using the pile-up of the disk type microfluidic-chips having highly increased the number of the microchannels and the holder having efficient structure capable of containing the chips.

The micro power cell embodied with the pile-up disk type microfluidic-chip serves as a power supply or a self-power chip and can be used for an electrophoresis, an operation of micro-scale devices for MEMS process such as micro pump, and charging of small portable electronic devices such as laptop and the like.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A disk type microfluidic-chip comprising:
   an inflow space at a center of the disk to which a fluid is supplied;
   a multi microchannel comprising microchannels being arranged to be parallel with each other at a regular interval and radially positioned around the inflow space, wherein a potential difference occurs between both ends of an inlet and an outlet of each microchannel by a streaming potential when the fluid passes through the microchannel; and
   an outflow space at a circumference of the disk from which the fluid is discharged,
   wherein the microchannel is uniformly straight and has a cross-sectional shape with a constant width, and an area between each of individual microchannels has a trapezoidal shape and a constant size.

2. The disk type microfluidic-chip of claim 1, wherein a width of the microchannel is about 10~200 μm, a depth thereof is about 10~200 μm, and a length of the microchannel is about 500 μm~0.5 cm,
   wherein a shorter base distance of the trapezoid is about 10~200 μm and a longer base distance of the trapezoid is about 30~600 μm, and
   wherein the number of the microchannels is about 100~1000.

3. The disk type microfluidic-chip of claim 1, wherein the chip consists of an upper substrate and a lower substrate,
   wherein the upper substrate is provided with the multi microchannel formed at a height from a bottom surface thereof and forming a space through which the fluid is able to flow, and
   wherein the lower substrate is a flat plate having a thickness.

4. The disk type microfluidic-chip of claim 3, wherein the upper and lower substrates are made of polydimethylsiloxane.

5. The disk type microfluidic-chip of claim 1, wherein the chip consists of a single substrate, and
   wherein the substrate is provided with the multi microchannel formed at a height from a bottom surface thereof and forming a space through which the fluid is able to flow.

6. A pile-up disk type microfluidic-chip wherein the disk type microfluidic-chips according to claim 1 are bonded to each other vertically to increase the number of the microchannels.

7. The pile-up disk type microfluidic-chip of claim 6, wherein a width of the microchannel is about 10~200 μm, a depth thereof is about 10~200 μm, and a length of the microchannel is about 500 μm~0.5 cm,
   wherein a shorter base distance of the trapezoid is about 10~200 μm and a longer base distance of the trapezoid is about 30~600 μm, and
   wherein the number of the microchannels is about 100~1000.

8. The pile-up disk type microfluidic-chip of claim 6, wherein each of the disk type microfluidic-chips consists of an upper substrate and a lower substrate,
   wherein the upper substrate is provided with the multi microchannel formed at a height from a bottom surface thereof and forming a space through which the fluid is able to flow, and wherein the lower substrate is a flat plate having a thickness.

9. The pile-up disk type microfluidic-chip of claim 8, wherein the upper and lower substrates are made of polydimethylsiloxane.

10. The pile-up disk type microfluidic-chip of claim 6, wherein each of the disk type microfluidic-chips consists of a single substrate, and
wherein the substrate is provided with the multi microchannel formed at a height from a bottom surface thereof and forming a space through which the fluid is able to flow.

11. An electrokinetic micro power cell comprising a pile-up disk type microfluidic-chip according to claim 6 and a holder for containing the pile-up disk type microfluidic-chip therein, wherein the holder comprises:
a flow-in to which a fluid is supplied;
a tubular distributor allowing the fluid supplied through the flow-in to how into a multi microchannel through an inflow space of the pile-up disk type microfluidic-chip;
a chip insertion part allowing the disk type microfluidic-chip to be mounted therein;
a collector collecting the fluid flowing out of the multi microchannel of the pile-up disk type microfluidic-chip;
a connection part being fitted into the chip insertion part by a prescribed depth and having a flow-out formed thereto so as to discharge the fluid collected in the collector, transporting the fluid of the collector to the flow-out and sealing an uppermost end of a central inlet of the pile-up chip mounted in the chip insertion part;
a cover part wrapping the connection part and the chip insertion part to be sealed and preventing the fluid from flowing out of the holder; and
a pair of electrodes positioned at the distributor and either the collector or the connection part, respectively, and capable of being connected to an external circuit, and
wherein the cell generates an electric energy by means of a streaming potential of the fluid flowing in the microchannel.

12. The electrokinetic micro power cell of claim 11, wherein the distributor and either the collector or the connection part are provided with an electrode insertion part capable of allowing the pair of electrodes to be inserted.

13. The electrokinetic micro power cell of claim 11, wherein the fluid flows in the inflow space of the pile-up disk type chip and flows out to the outflow space of the pile-up chip.

14. The electrokinetic micro power cell of claim 11, wherein the chip insertion part provides the space so that the disk type microfluidic-chips are able to be mounted therein and take a cylindrical shape having an inner diameter of 20 mm and a height of 40 mm,
wherein plastic rings are provided between the chip and the connection part and between the chip and the chip insertion part so as to protect the pile-up chip and to prevent a water leakage, and
wherein the electrode arranged at the distributor passes through all the inflow spaces of the piled chips and the end of the electrode is positioned in a center of the inflow space of a chip located at the uppermost part.

15. The electrokinetic micro power cell of claim 11, wherein a width of the microchannel is about 10~200 μm, a depth thereof is about 10~200 μm, and a length of the microchannel is about 500 μm~0.5 cm,
wherein a shorter base distance of the trapezoid is about 10~200 μm and a longer base distance of the trapezoid is about 30~600 μm, and wherein the number of the microchannels is about 100~1000.

16. The electrokinetic micro power cell of claim 15, wherein the distributor and either the collector or the connection part are provided with an electrode insertion part capable of allowing the pair of electrodes to be inserted.

17. The electrokinetic micro power cell of claim 15, wherein the fluid flows in the inflow space of the pile-up disk type chip and flows out to the outflow space of the pile-up chip.

18. The electrokinetic micro power cell of claim 15, wherein the chip insertion part provides the space so that the disk type microfluidic-chips are able to be mounted therein and take a cylindrical shape having an inner diameter of 20 mm and a height of 40 mm,
wherein plastic rings are provided between the chip and the connection part and between the chip and the chip insertion part so as to protect the pile-up chip and to prevent a water leakage, and
wherein the electrode arranged at the distributor passes through all the inflow spaces of the piled chips and the end of the electrode is positioned in a center of the inflow space of a chip located at the uppermost part.

19. The electrokinetic micro power cell of claim 11, wherein each of the disk type microfluidic-chips consists of an upper substrate and a lower substrate,
wherein the upper substrate is provided with the multi microchannel formed at a height from a bottom surface thereof and forming a space through which the fluid is able to flow, and
wherein the lower substrate is a flat plate having a thickness.

20. The electrokinetic micro power cell of claim 19, wherein the distributor and either the collector or the connection part are provided with an electrode insertion part capable of allowing the pair of electrodes to be inserted.

21. The electrokinetic micro power cell of claim 19, wherein the fluid flows in the inflow space of the pile-up disk type chip and flows out to the outflow space of the pile-up chip.

22. The electrokinetic micro power cell of claim 19, wherein the chip insertion part provides the space so that the disk type microfluidic-chips are able to be mounted therein and take a cylindrical shape having an inner diameter of 20 mm and a height of 40 mm,
wherein plastic rings are provided between the chip and the connection part and between the chip and the chip insertion part so as to protect the pile-up chip and to prevent a water leakage, and
wherein the electrode arranged at the distributor passes through all the inflow spaces of the piled chips and the end of the electrode is positioned in a center of the inflow space of a chip located at the uppermost part.

23. The electrokinetic micro power cell of claim 19, wherein the upper and lower substrates are made of polydimethylsiloxane.

24. The electrokinetic micro power cell of claim 23, wherein the distributor and either the collector or the connection part are provided with an electrode insertion part capable of allowing the pair of electrodes to be inserted.

25. The electrokinetic micro power cell of claim 23, wherein the fluid flows in the inflow space of the pile-up disk type chip and flows out to the outflow space of the pile-up chip.

26. The electrokinetic micro power cell of claim 23, wherein the chip insertion part provides the space so that the disk type microfluidic-chips are able to be mounted therein and take a cylindrical shape having an inner diameter of 20 mm and a height of 40 mm, wherein plastic rings are provided between the chip and the connection part and between the chip and the chip insertion part so as to protect the pile-up chip and to prevent a water leakage, and wherein the electrode arranged at the distributor passes through all the inflow spaces of the piled chips and the end of the electrode is positioned in a center of the inflow space of a chip located at the uppermost part.

27. The electrokinetic micro power cell of claim 11, wherein each of the disk type microfluidic-chips consists of a single substrate, and wherein the substrate is provided with the multi microchannel formed at a height from a bottom surface thereof and forming a space through which the fluid is able to flow.

28. The electrokinetic micro power cell of claim 27, wherein the distributor and either the collector or the connection part are provided with an electrode insertion part capable of allowing the pair of electrodes to be inserted.

29. The electrokinetic micro power cell of claim 27, wherein the fluid flows in the inflow space of the pile-up disk type chip and flows out to the outflow space of the pile-up chip.

30. The electrokinetic micro power cell of claim 27, wherein the chip insertion part provides the space so that the disk type microfluidic-chips are able to be mounted therein and take a cylindrical shape having an inner diameter of 20 mm and a height of 40 mm, wherein plastic rings are provided between the chip and the connection part and between the chip and the chip insertion part so as to protect the pile-up chip and to prevent a water leakage, and wherein the electrode arranged at the distributor passes through all the inflow spaces of the piled chips and the end of the electrode is positioned in a center of the inflow space of a chip located at the uppermost part.

\* \* \* \* \*